No. 706,274. Patented Aug. 5, 1902.
W. H. STOUT.
MACHINE FOR MAKING VENEER BOXES.
(Application filed Feb. 7, 1902.)
(No Model.) 9 Sheets—Sheet 1.

Fig. 1.

WITNESSES.

W. H. Stout,
INVENTOR.
By R. J. McCarty,
his ATTORNEY.

No. 706,274. Patented Aug. 5, 1902.
W. H. STOUT.
MACHINE FOR MAKING VENEER BOXES.
(Application filed Feb. 7, 1902.)
(No Model.) 9 Sheets—Sheet 2.

Fig. 2.

WITNESSES.
W. H. Stout,
INVENTOR
By R. J. McCarty,
his ATTORNEY.

No. 706,274.

W. H. STOUT.

MACHINE FOR MAKING VENEER BOXES.

(Application filed Feb. 7, 1902.)

(No Model.)

Patented Aug. 5, 1902.

WITNESSES.
cm Theobald
Marthur Sublin

W. H. Stout,
INVENTOR.
By R. J. McCarty,
his ATTORNEY.

THE NORRIS PETERS CO., PHOTO-LITHO., WASHINGTON, D. C.

No. 706,274. Patented Aug. 5, 1902.
W. H. STOUT.
MACHINE FOR MAKING VENEER BOXES.
(Application filed Feb. 7, 1902.)
(No Model.) 9 Sheets—Sheet 5.

No. 706,274. Patented Aug. 5, 1902.
W. H. STOUT.
MACHINE FOR MAKING VENEER BOXES.
(Application filed Feb. 7, 1902.)

(No Model.) 9 Sheets—Sheet 6.

WITNESSES
C. M. Theobald
Matthew Siebler

W. H. Stout.
INVENTOR
By R. J. McCarty,
his ATTORNEY

THE NORRIS PETERS CO., PHOTO-LITHO., WASHINGTON, D. C.

No. 706,274. Patented Aug. 5, 1902.
W. H. STOUT.
MACHINE FOR MAKING VENEER BOXES.
(Application filed Feb. 7, 1902.)
(No Model.) 9 Sheets—Sheet 7.

WITNESSES
C. M. Theobald
Matthew Sutler

INVENTOR
W. H. Stout
By R. J. McCarty
his ATTORNEY

No. 706,274. Patented Aug. 5, 1902.
W. H. STOUT.
MACHINE FOR MAKING VENEER BOXES.
(Application filed Feb. 7, 1902.)

(No Model.) 9 Sheets—Sheet 9.

WITNESSES.
INVENTOR.
ATTORNEY.

UNITED STATES PATENT OFFICE.

WILLIAM H. STOUT, OF DAYTON, OHIO.

MACHINE FOR MAKING VENEER BOXES.

SPECIFICATION forming part of Letters Patent No. 706,274, dated August 5, 1902.

Application filed February 7, 1902. Serial No. 93,041. (No model.)

*To all whom it may concern:*

Be it known that I, WILLIAM H. STOUT, a citizen of the Dominion of Canada, residing at Dayton, in the county of Montgomery and State of Ohio, have invented certain new and useful Improvements in Machines for Making Veneer Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for making veneer boxes of cylindrical form.

Preceding a detail description of my invention reference is made to the accompanying drawings, of which—

Preceding a detail description of the invention, similar reference characters indicate corresponding parts throughout the several views of the drawings.

1 designates the lower or base portion of the frame, which may be constructed of wood or metal.

2 2 designate upright supports, which support the entire nailing mechanisms, which will hereinafter be described in detail.

3 3 designate further upright supports, which provide bearings for mechanism which coöperates with the nailing mechanisms.

4 is a lower horizontal beam which is placed in the lower frame and occupies a central position therein.

Figures 21, 22, 23, 24:
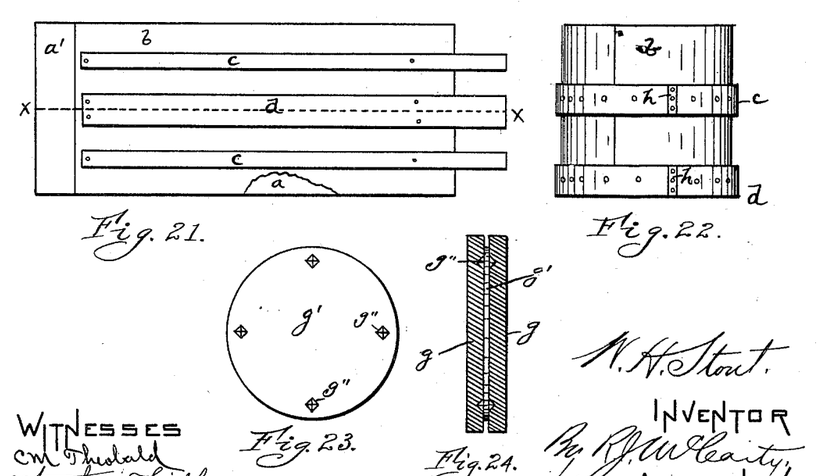
Fig. 21 is a plan view of the veneer blank from which the box is formed.
Fig. 22 is a view of the finished box.
Fig. 23 is a detail view of the plate which temporarily secures the bottoms of the boxes.
Fig. 24 is a sectional view through two bottoms, showing the holding-plate in position.

5 5 designate two cylinders or drums around which the veneer blank, as shown in Fig. 21, is placed in the operation of the machine to form the cylindrical boxes, as shown in Fig. 22. In the operation of these drums they are subjected to rotary movements and horizontal reciprocating movements toward and from each other.

Figure 1:
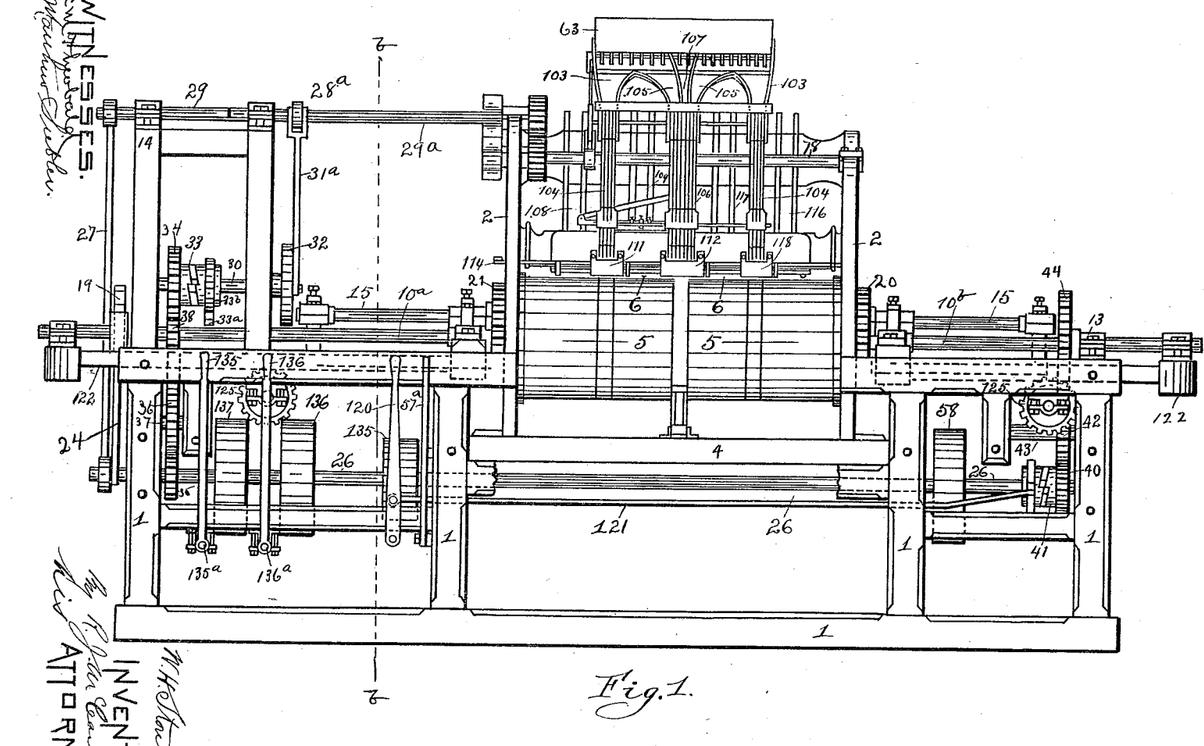
Figure 1 is a front elevation of my improved box-machine.
Figures 4, 15, 16:
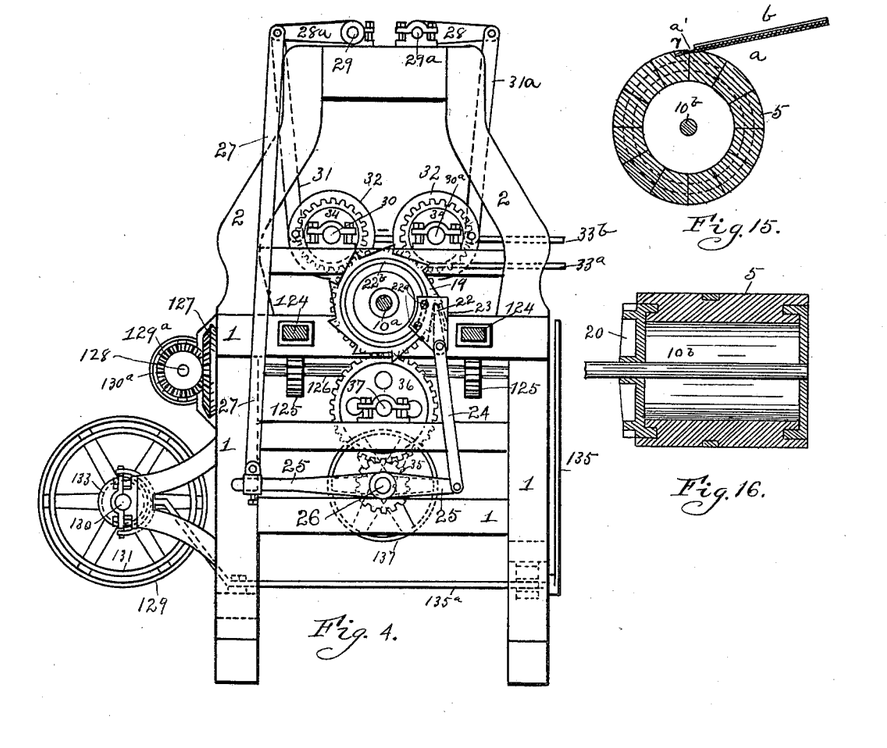
Fig. 4 is a sectional end elevation on the line $a\,a$ of Fig. 3.
Figs. 15 and 16 are sectional views of one of the drums at right angles.
Figure 5:
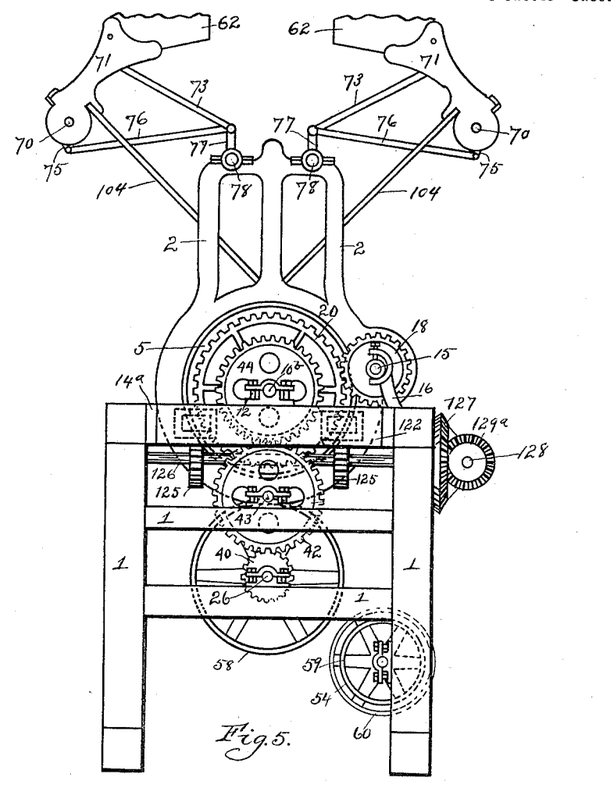
Fig. 5 is an opposite end elevation.
Figures 26, 27:
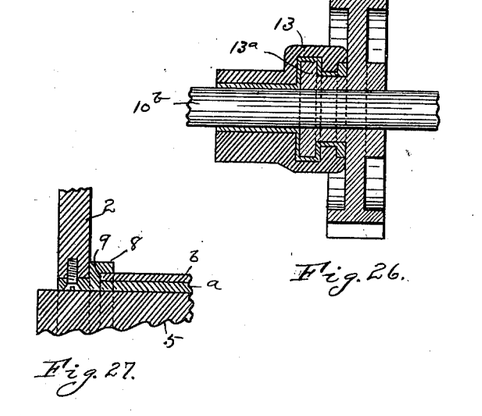
Fig. 26 is a sectional view of one of the retainer box-bearings for holding the gears in position against lateral movement.
Fig. 27 is a partial sectional view of one of the drums and the frame, showing one of the retaining flanges or rings which strip the boxes from the drums.

Referring to Fig. 1, the veneering is fed in one sheet, consisting of two veneers and bands placed thereon. These two sheets of veneering are held temporarily together by means of a suitable number of tacks, as are also the bands which surround them. The veneering when ready to be fed into the machine is placed together, as shown in the drawings, Fig. 21, wherein it will be seen that $a$ and $b$ constitute two leaves or veneers, which are placed together, and on the outer veneer $b$ there are placed three strips $c\,d\,c$. These, as before stated, are temporarily secured together in order that they may be maintained in proper relative positions during their passage around the cylinders or drums. Each piece of veneering so prepared is fed to the drums 5 5 at the top through the opening 6. Secured to the circumference of each of the drums 5 5 there is a metallic lip 7, (see Fig. 15,) which receives the transverse forward edge *a'* of the lower veneer *a*, and thereby carries the veneer around the drums in the rotation thereof. The manner of engaging the veneer, as above indicated, is shown in Fig. 15 of the drawings. On the inside of each of the upright frames 2 there is a circular flange 8, (see Fig. 27,) which projects slightly over the outer ends of the drums, and between said drums and said flanges there is a suitable space for the veneer to pass under the flange and around the drums. The object of these circular flanges 8 is to strip the boxes from the drums as said drums are separated in the outer horizontal movement thereof. This is accomplished by the outer edges of the boxes coming against the shoulders 9, and thereby being held in position while the drums are permitted to move out. (See Fig. 27.) As before stated, the drums 5 5 are given both a rotary and horizontal reciprocating movement. The former movement takes place in order to draw the veneer around the drums. This rotary movement is imparted through the following mechanism:

$10^a$ $10^b$ designate the drum-shafts, which are journaled in boxes 11 12 13. The box 13 on one end of the machine is below the cross-piece 14, while on the other end it is on the cross-piece $14^a$. The interior construction of the boxes 13 is shown in Fig. 26, where the inner collar $13^a$ is shown to be held against any lateral movement when the shafts $10^a$ and $10^b$ are moved longitudinally.

15 designates a shaft which has bearings 16 and 17 at each end. The bearings 17 have the construction shown in Fig. 26 and a horizontal reciprocating movement with the frames 12 2.

Figure 13:
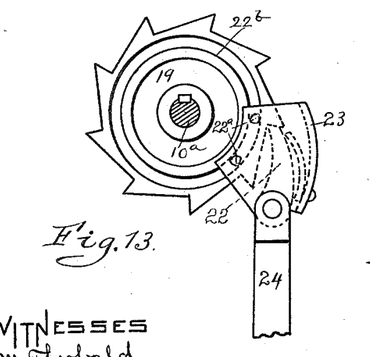
Figs. 13 and 14 are detail views of the ratchet mechanism which imparts the primary movement to the drums.
Figure 14:
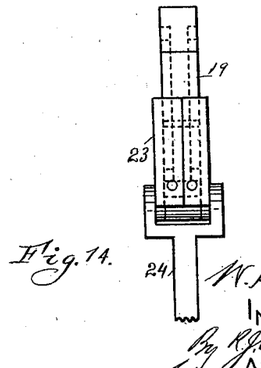

The shaft 15 has a keyway which receives a key on gears 18, so that one drum cannot move horizontally without the other whether the drums are together, as shown in Fig. 1 of the drawings, or whether they are separated, which separation takes place after the boxes are formed. The drums 5 5 have two separate rotary operations, the initial one of which is intermittent and is instrumental in forming and nailing the cylinder or box, and the subsequent one of which is continuous and is instrumental in cutting the cylinder or box into two equal parts, thereby making two boxes in each operation of the machine. These movements are obtained from the opposite ends of the machine. The initial movement of the drums is obtained through a ratchet-wheel 19, which is on the drum-shaft $10^a$, and this movement is transmitted to the other drum through the shaft 15 and spur-gears 18, one of said gears 18 meshing with a gear 20 on the other drum-shaft $10^b$. Shaft 15 is rotated from gear 21 on drum-shaft $10^a$, the said gear 21 meshing with a spur-gear 18 on said shaft 15, as before stated. Movement is imparted to the ratchet-wheel 19 from the ratchet-dog 22, which is inclosed in a housing 23 and is pivoted to an operating-lever 24. This lever, as shown in Figs. 4, 13, 14 of the drawings, projects upwardly and rotates the ratchet-wheel 19 from below; but it is obvious that it may project down and rotate the said ratchet-wheel from above. The lever 24 is pivoted to a lever 25, which has its fulcrum on the main power-shaft 26, which extends throughout the length of the machine, as shown in Fig. 1. This shaft 26 is the line-shaft of the machine from which every operative element in the machine receives its movement. The lever 25 has an adjustable connection with a link-lever 27, the upper end of which has a pivotal connection with a short lever 28. The lever 28 is rigidly mounted on an upper shaft 29, which has a rocking movement. The clutch-shaft 30 transmits motion to shaft 29 through a pitman 31 and eccentric 32, the latter being connected to the shaft 30 and is operated by clutch 33. One member of the clutch 33 is an integral part of a spur-wheel 34, which is loose on the clutch-shaft 30. Clutch 33 is operated by hand-lever $33^a$. The portion of the clutch 33 which is an integral part of the spur-wheel 34 has a collar on the inside which holds it in position, while the movable portion of said clutch has a sliding movement by means of a key in order to engage the shaft 30. As before stated, line-shaft 26 introduces the power to the machine, and shaft 29, which I will term "one of the shafts of the nailing-department," receives its motion through a train of gearing consisting of gear-wheels 35 on line-shaft 26 and an intermediate gear-wheel 36 on the counter-shaft 37. Gear-wheel 36 engages with a similar wheel 38 on the drum-shaft $10^a$, and the said wheel 38 engages with the spur-wheels 34, one of which, as before stated, is on the clutch-shaft 30 and the other of which is on shaft $30^a$. Wheel 38 is loose on the drum-shaft $10^a$. One of the eccentrics 32 is instrumental in connection with the mechanism for nailing the metallic strips on the ends of the hoops *c c* and *d*, and said eccentric is connected to pitman $31^a$, which in turn is connected to a short lever 28, the latter being fast on rocker-shaft $29^a$.

It will be understood that the shaft 29, which, as before stated, is the main shaft of one of the nailing-departments, is rotated simultaneously with the rotation of the drums. During this operation of rotating the drums the nailing of the veneers and hoops takes place, which completes the formation of each cylinder, from which two boxes are made. The other or continuous unintermittent rotary movement of the drums, which has been heretofore referred to, is for the purpose of cutting this cylinder in the center into two parts, and this movement comes into operation at the completion of the movement which forms and constructs the cylinders.

It will be borne in mind that the operation of rotating the drums during the nailing operation is an intermittent movement—that is to say, the drums are stopped at suitable intervals for the nailing operation to take place—and after the nailing operations are completed the rotary movement of the drums is continuous until the cylinder or box is separated or cut into two equal portions. This subsequent continuous movement takes place as follows: 40 designates a spur-gear, which is loose on line-shaft 26, and there is also a clutch 41 on said line-shaft, one portion of which is fast by means of a collar on the shaft 26 and turns continuously with the spur-wheel 40. The other portion of the clutch 41 has a sliding movement on said shaft and is keyed to rotate therewith. Spur-wheel 40 meshes with a similar wheel 42 on a short counter-shaft 43. Spur-wheel 42 drives a similar wheel 44 on the drum-shaft $10^b$. The latter wheel 44 is keyed to the drum-shaft $10^b$, but has a sliding movement thereon and is held in position by one of the boxes 13.

It will be borne in mind that the spur-wheel 38 is merely a transmission-wheel to transmit power to the clutch-shaft 30 and does not perform the function of the spur-wheel 44, which is on the other drum-shaft $10^b$. This spur-wheel 44 on one of the drum-shafts performs a function similar to the ratchet-wheel 19 on the other drum-shaft $10^a$, the said ratchet-wheel 19 having a sliding and rotary movement on the drum-shaft similar to the wheel 44. The main rotary movement of the drums, during which the nailing operations take place, is transmitted through the ratchet-wheel 19. After this operation is completed the clutch 41 is immediately thrown in and transmits power to the other drum-shaft $10^b$ to complete the rotation of the drums, during which the cylinders or boxes are divided or sawed into two parts.

Figures 6, 19, 20:
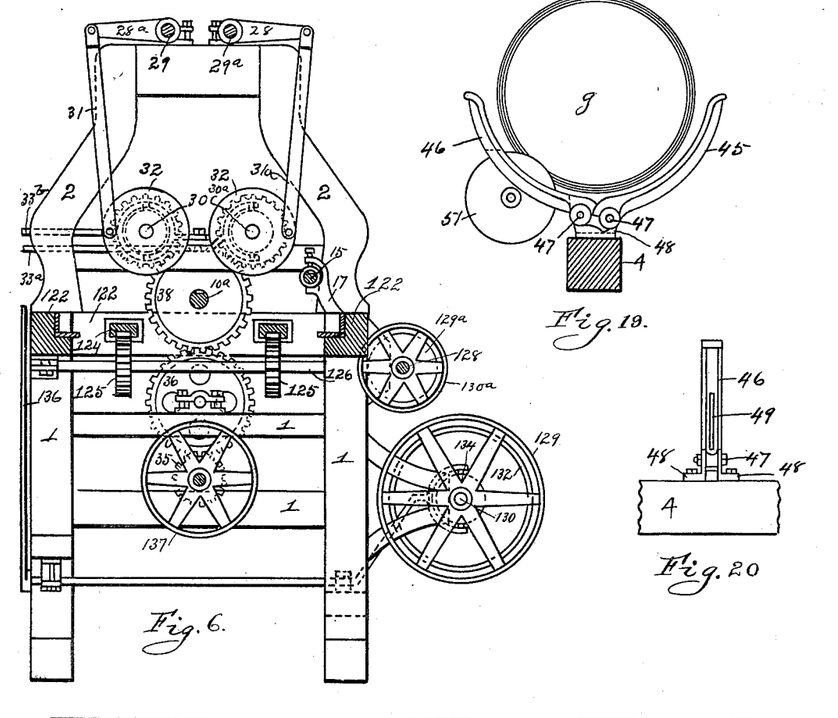
Fig. 6 is a sectional elevation on the line $b\,b$ of Fig. 1 looking to the left.
Fig. 19, a detail view of the saddle for holding the bottoms of the boxes.
Fig. 20 is a detail front view of the saddle with the bottom of a box removed.
Figure 7:
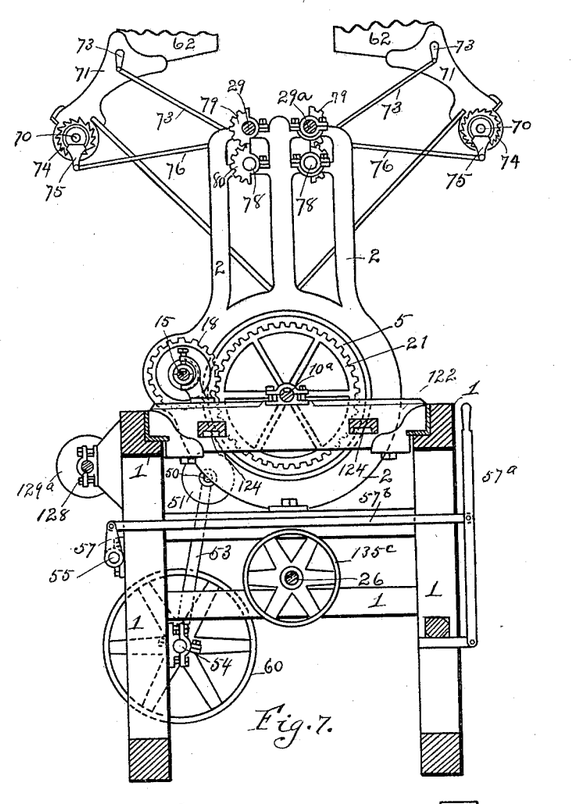
Fig. 7 is a sectional end elevation on the line $b\,b$ of Fig. 1 looking to the right.

I will now describe means for holding the bottoms of the boxes in position until they are received by the meeting ends of the drums. (See Figs. 19 and 20.) The bottoms $g$ are first prepared of suitable diameter and are placed together with an intervening disk $g'$ of metal or other material of a smaller diameter, as in Fig. 24. This metallic disk has a suitable number of spurs $g''$ projecting from each side, which enter the bottoms $g$ and hold said bottoms in a temporary position therewith. The bottoms and this intervening disk so placed together are placed in a saddle, which consists of two jaws 45 and 46, which are shown in detail in Figs. 19 and 20 of the drawings and which have a knuckle-joint at their inner ends. These jaws are pivoted at 47 between plates 48, the said plates 48 being secured to the beam 4 in the center of said beam. One of the jaws—to wit, 46—has a saw-slot 49, which permits the saw to enter it in sawing the cylinder. These jaws are held in their upper position to hold the bottoms in position to be received by the drums. The jaw 45 is nearest to the operator or is in the front of the machine, and the said jaws are made to hold the bottoms by holding the jaw 45 up by the hand. After the bottoms have been received by the drums coming together the jaw 45 is permitted to drop, thus letting jaw 46 drop back and permitting it to let the veneers pass around the drums. 50 designates the saw-arbor, which has adjustably mounted thereon two end saws 51 51. There is also mounted permanently upon this arbor a center saw 52, which cuts the cylinder in the middle into two equal parts. This saw-arbor 50 is mounted in a swinging frame 53, which is journaled on the lower shaft 54, the latter shaft being mounted in the frame of the machine. 55 is an oscillating or rock shaft, which is also suitably mounted in the frame. The swinging saw-frame 53 is connected to this rock-shaft 55 by a crank 56. The shaft 55 is turned by means of a hand-lever $57^a$, which is connected to a link-lever $57^b$, the latter being connected to crank 57. (See Figs. 2 and 7.) By means of these levers the saw-frame 53 is moved to a position for the saws to operate or to remove said saws away from such position. The two outer saws 51, as before stated, are adjustable on the arbor, and these saws cut the ends of the cylinder to the required length for suitable boxes. The saw-shaft 50 is driven from line-shaft 26 through shaft 54, which is operated by means of pulleys 58 59, the said saw-shaft being belted to shaft 54 by pulleys 60 and 61.

Figure 2:
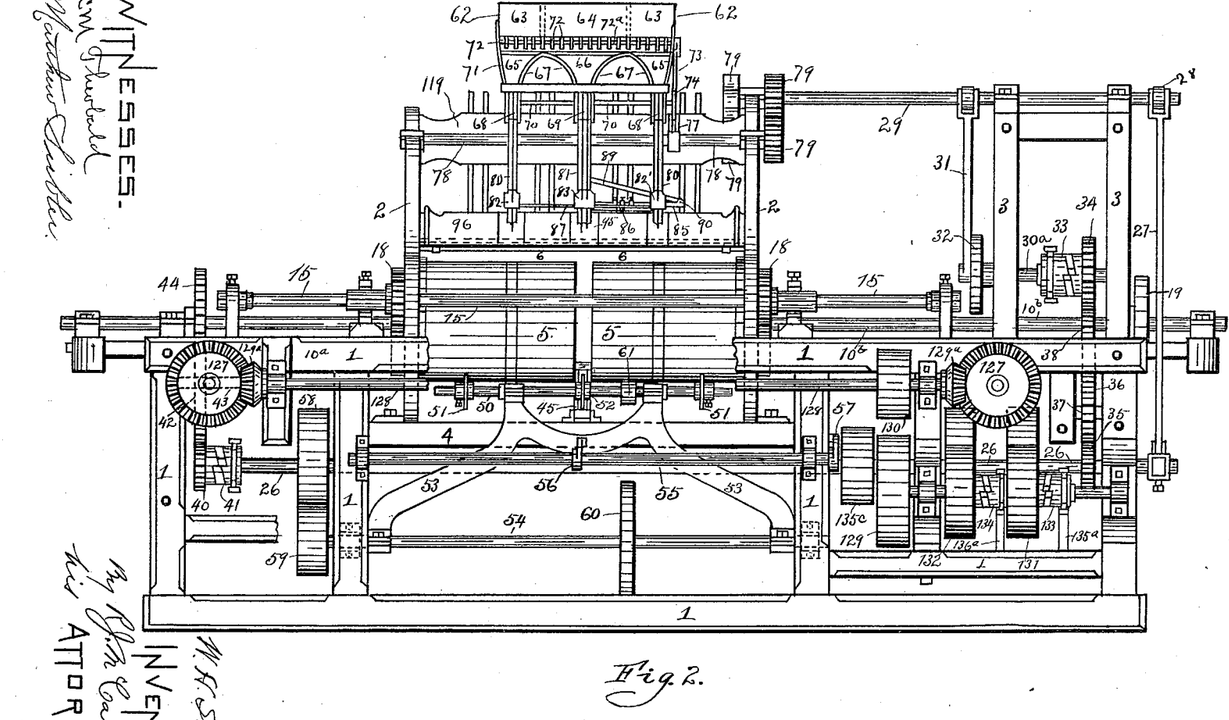
Fig. 2 is a rear elevation of the same.
Figure 8:
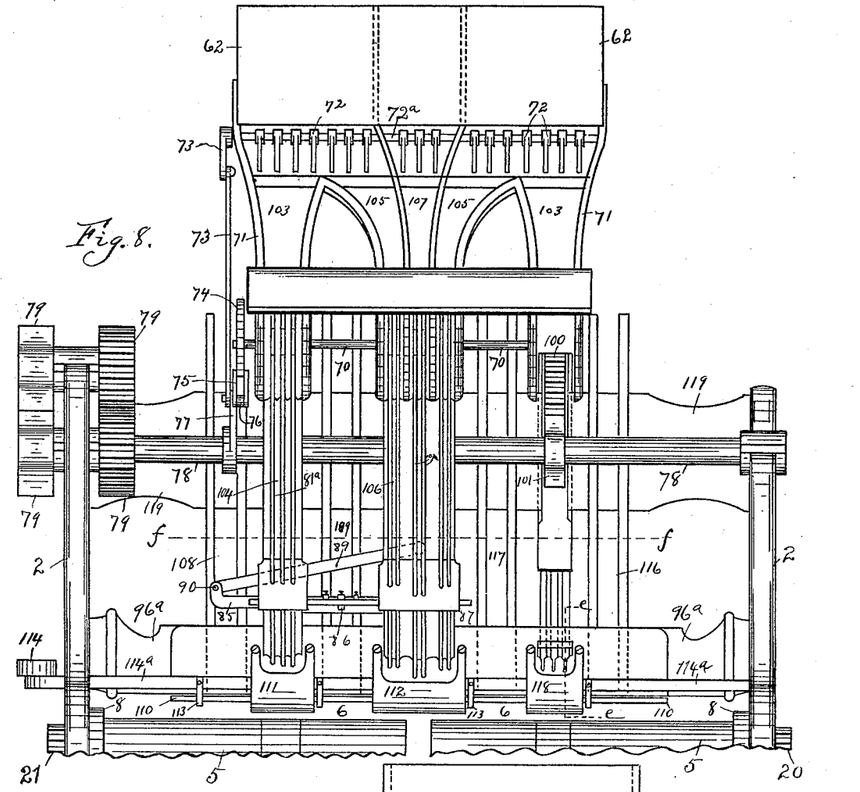
Fig. 8 is an enlarged front elevation of the nailing mechanism.
Figure 12:
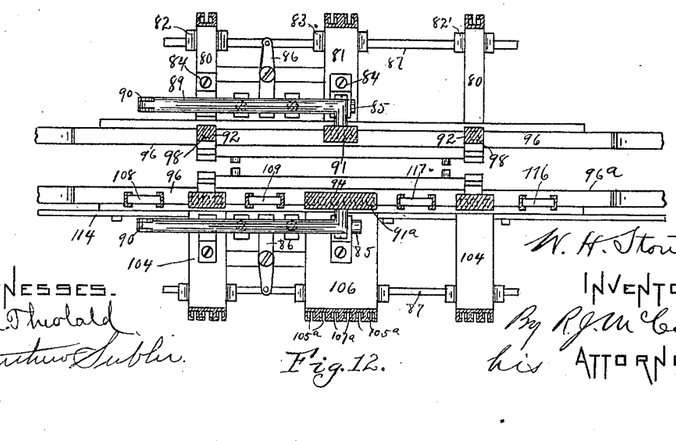
Fig. 12 is a sectional view on the line $f\,f$ of Fig. 8.
Figure 17:
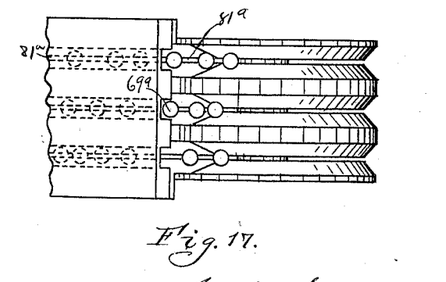
Figs. 17 and 18 are side elevations and top views of the nail or tack feeding wheels.
Figure 18:
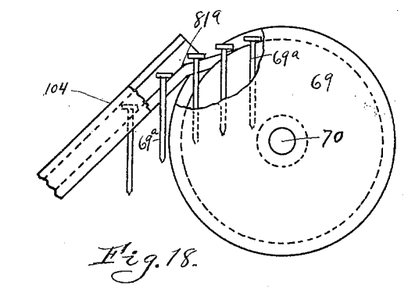
Figure 25:
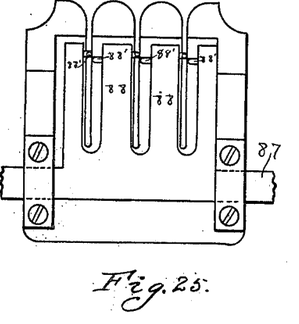
Fig. 25 is a detail rear view of one of the nail-separators.

I will next describe the nailing mechanism, by means of which the boxes are completed. This mechanism is mounted between the upright frames 2 2 and consists as follows: One side of the machine—to wit, the rear side, as shown in Fig. 2—contains the mechanism for nailing the veneers and hoops together, while the front side contains the mechanism for nailing the metallic strips by means of which the ends of the hoops are united. Referring to Fig. 2, 62 designates a hopper which has three divisions 63 64 63. The two end divisions contain tacks for uniting the bands or hoops $c$ and $d$ to the cylinders or boxes. The center compartment 64 contains nails for uniting the bottoms to the boxes through the bottom bands $d$. The bottoms of these hoppers have a suitable angle or fall, as in Fig. 10, in order that the tacks and nails may feed by gravity through passages 65 65 66. The passages just mentioned are inclosed by walls 67, and they direct the tacks onto feed-wheels 68 68. The center passage 66 directs the nails $69^a$ in a similar manner to feed-wheel 69. These wheels have a V-shape groove around their peripheries and have suitable space for the body of the nails to enter, as seen in Fig. 17, the said nails being supported in the wheels by the heads entering in said V-shape grooves. The said wheels are mounted on an arbor 70, which is journaled in the side plates 71 of the feed-hopper. Extending throughout the length of the feed-hopper, adjacent to where the tacks and nails enter the passages 65 66, there is placed a series of fingers or agitators 72, which have a suitable oscillatory movement to cause the nails and tacks to properly enter said passages. The arbor 72ª, upon which the fingers or agitators 72 are fixed, is connected to crank 73. (See Fig. 10.) The arbor 70, upon which the feed-wheels 68 and 69 are mounted, is rotated by ratchet-wheel 74, which is turned by ratchet-pawl 75, said ratchet-pawl being connected to operating-lever 76. The operating-lever 73, which actuates the agitators or fingers 72, and the operating-lever 76, which, as before stated, actuates the feed-wheel shaft 70, have connections with cranks 77, which in turn are fixed to shaft 78, journaled in boxes on the upper portion of the side frames 2. Shaft 78 is driven from shaft 29 by segment-gears 79, each set of segment-gears being on opposite sides of one of the frames 2. The feed-wheels 68 68 deliver the tacks to the tack-chutes 80, and the center feed-wheel 69 delivers the nails to the nail-chute 81. The tacks and nails when they enter these chutes are held by their heads, the bodies of said tacks and nails projecting through slots 81ª in said chutes. As the nails and tacks gravitate down the chutes they enter separators 82, 82', and 83, said separators being attached to the lower ends of the chutes. In the rear of the separators 83 82' there are placed boxes or bearings 84, which provide a bearing for a reciprocating rod 85. From rod 85 there is an arm 86, which connects with the separator-rod 87. (See Fig. 12.) This rod 87 extends through all of the separators 82, 82', and 83 and has a horizontal reciprocating movement, which operates fingers 88, projecting therefrom. (See Fig. 25.) The fingers 88 are in the separators 82, 82', and 83 and are actuated to release one nail and one tack at a time in each separator by means of pins 88'. The reciprocating movement is imparted to the separator-rod 87 through rod 85 and the connection 86 by an arm 89. The arm 89 is pivoted to the reciprocating rod 85 at 90, and the other end of said arm 89 is pivoted to the center nail-plunger 91, so that in the movement of said nail-plunger 91 (see Fig. 12) the arm 89 is raised or lowered to impart the necessary movements to rods 85 and 87 through lever 86. The nail-plunger 91 is lowered to drive the nails as each nail is delivered from the separator 83 to a position to be driven through the veneering and the lower hoop into the bottoms. 92 92 designate the tack-plungers, which operate simultaneously with the nail-plunger 91 to drive the tacks through the center bands c. Referring to the opposite side of the machine, as shown in Figs. 1 and 8, which show the mechanism for applying the metallic strips, the nail-plunger 91ª on that side of the machine has two nail-drivers 94 94, (see Fig. 12,) which pass through a guide-opening 97 in one of the transverse plates 96ª, said plates 96ª being secured between the upright frames 2. The nails enter these vertical openings 97, into which the nail-drivers 94 enter in their downward movement. (See Fig. 9.) Each of the tack-plungers 92 on one side of the machine, as shown in Fig. 12, has a single tack-driver 98, which enters guide-openings in plate 96. The tacks are fed one at a time in a manner similar to the feed of the nails. The tack and nail plungers on both sides of the machine have racks 100, which mesh with segment-gears 101 on shafts 78. The shafts 78 are driven from gears 79 79 from shafts 29 29ª. (See Fig. 7.) Fig. 1 shows the opposite side of the nailing-department from that shown in Fig. 2 and will be further described.

103 103 and 105 105 designate tack-passages. Passages 103 103 lead to chutes 104, and passages 105 105 lead to the outer side openings 105ª of the central chute 106. The center passage 107 leads to the two inner openings 107ª of the chute 106. (See Fig. 12.) The outer openings 105ª in chute 106 convey tacks, and the centermost passages 107ª are nail-passages. The side chutes 104 104 each deliver tacks for three drivers, which secure the tins h on the overlapping ends of the hoops. (See Figs. 11 and 22.) This operation of uniting the said tins or metallic strips h on the adjacent ends of the hoops takes place upon the completion of the cylinder. The hoops referred to in the present instance are the center hoops c c and the bottom hoops d.

Figures 9, 10, 11:
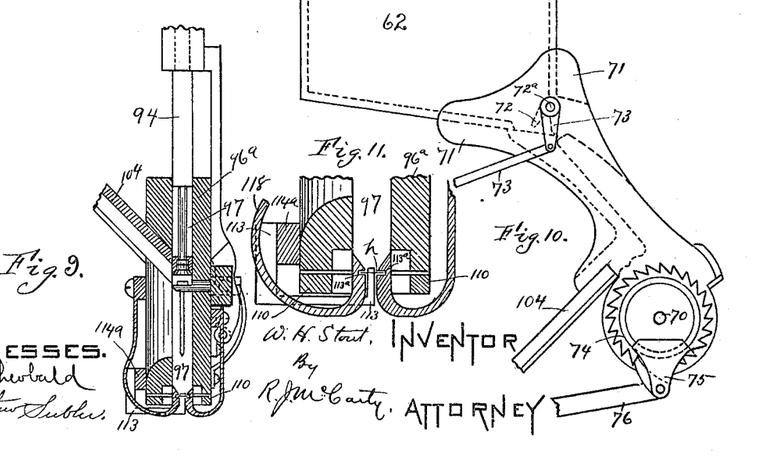
Fig. 9 is an enlarged sectional view on the line $e\,e$ of Fig. 8.
Fig. 10 is an enlarged side elevation of the nail-hopper.
Fig. 11 is an enlarged detail view of the metallic strip-holding device.

108 and 109, 116 and 117 designate tin chutes or racks. These are filled with a suitable number of metallic strips h of a suitable size, one placed upon the other, the racks or chutes being filled therewith. The lower end of each rack is open, and below said open ends there is a stationary plate 110, which lies a little below the ends of the chutes or racks and forms the bottoms for the metallic strips h to rest upon. Above this plate 110 and immediately below each chute there is a slide 113, which pushes the metallic strips h sidewise into the slots 113ª in the spring-holders 111 112 118. (See Figs. 8 and 11.) The slides 113 are connected to a reciprocating bar 114ª, which lies against plate 96ª and is supported in the side frames 2 2. The slides or plates 113 have the angular shape shown in Fig. 11. The bar 114ª is operated by hand-lever 114. The sliding bar 114ª is moved to the right, as seen in Fig. 8, to advance each metallic strip h to the springs 111 112. These springs have the curves, as shown in Fig. 11, and the strips h when delivered to said springs are held in a position below the plungers. When the plungers are lowered, the springs open or spread and permit the strips or tins to drop into positions on the hoops or bands, and the continued movement of the plungers drives the tacks and unites said tins to the hoops and box. When the tacks drop to a position to be driven by the drivers on the plungers, the metallic strips are in position. The bar 114ª is operated by hand to feed these metallic strips before the side of the nailing-department (shown in Fig. 1) is put in operation for each driving.

It will be understood that the side of the machine shown in Fig. 2—that is to say, the nailing-department, which unites the cylinder and hoops—remains stationary or inoperative while the opposite side is nailing the tins or strips to the hoops and cylinder. The operation of feeding the metallic strips from the tin-racks 116 117 is the same, only the movement of the bar 114ª operates the tin-slides 113 to advance the metallic strips to springs 118 112 from the opposite side. (See Fig. 8.)

Figure 3:
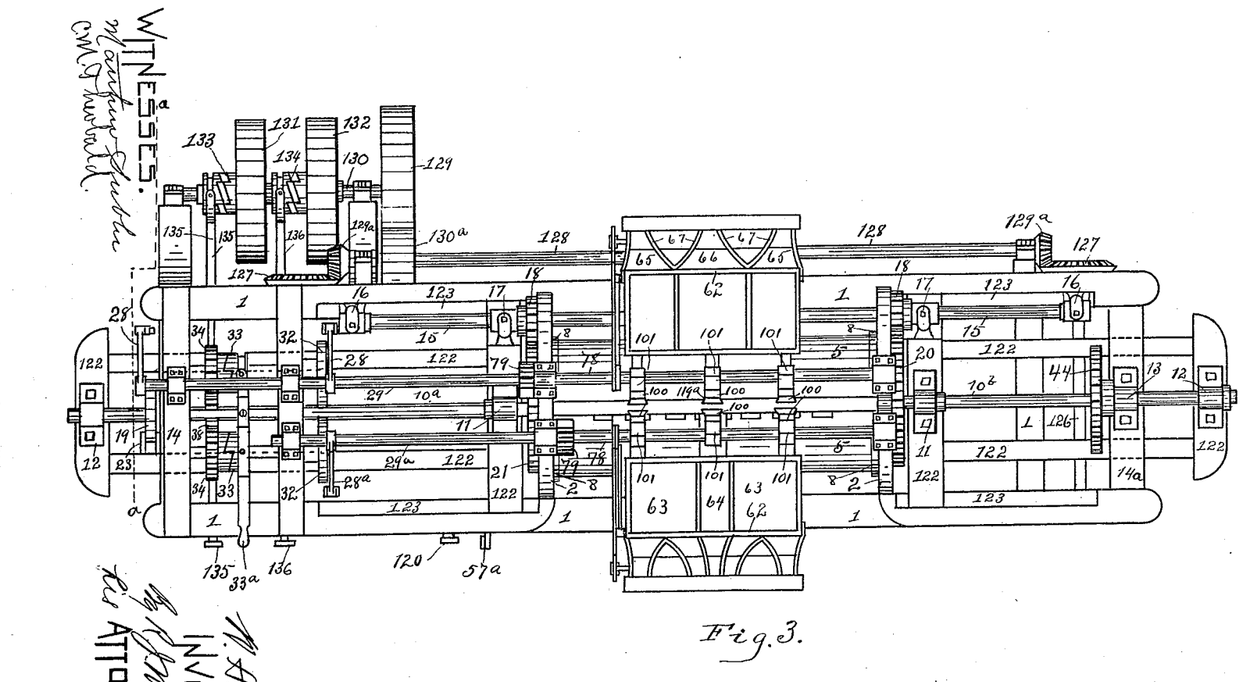
Fig. 3 is a top plan view.

It will be understood that there are two metallic strips $h$ fed into the spring-holder 112, one on each side from opposite directions, but at different times. For example, when the bar 114ª is moved to the right, as shown in Fig. 8, the metallic strips are fed to the holding-springs 111 112 to the left and when bar 114ª is moved to its return position the metallic strips are fed from racks 116 117 to holding-springs 118 112 from the opposite side. The operation of feeding the tacks and nails to drive these metallic strips is the same as the operation of driving the tacks and nails heretofore described in connection with Fig. 2. 119 is a transverse plate upon the sides of which are V-shape or dovetail grooves 119ª, in which the plungers work up and down when given their movement. This plate 119 is secured to the upright frames 2. Immediately after the completion of the operation of placing the metallic strips $h$ upon the bands, which, as before stated, takes place immediately after the completion of the nailing of the body of the box, the saws 51 52 complete their operation of cutting the cylinder in two parts on the dotted line $xx$ of Fig. 21. Immediately as the saw begins its final cutting the clutch 41 is thrown in gear by the hand operation of the lever 120, this lever 120 having connection with said clutch through a connecting-rod 121. The said lever 120 will be seen in Fig. 1. When the cuts are completed, the clutch 41 is thrown out of gear and the drums 5 5 remain stationary. The bearings of the drum-shafts 10ª 10ᵇ, as shown in Fig. 3, are mounted on horizontal reciprocating frames consisting of parts 122, which move on tracks 123 on the top of the frame 1 and are guided through the cross-beams 14 14ª at each end of the machine.

As before stated, when the operation of forming a cylinder and cutting it into the proper dimensions for boxes is completed the drums are brought to a stop, immediately after which they are moved outwardly to strip the boxes therefrom, the said boxes being, as before stated, held in position by the annular retaining-flanges 8, against which the top edges of the boxes abut in the outward movement of the drums. (See Fig. 27.) This outward movement of the drums is performed by moving the sliding frames 122 outwardly, and this movement is accomplished by means of racks 124, (see Fig. 4,) which racks are secured beneath each of the parallel parts 122 of said sliding frames. In gear with each of these racks on each side of said sliding frames are pinions 125. The pinions 125 are fast on cross-shafts 126, said cross-shafts being driven from miter-gears 127 129ª, which in turn are driven from shaft 128. The shaft 128 is driven by belts around pulleys 129 130ª. Pulley 129 is on a counter-shaft 130, which is driven from the line-shaft by pulley 131. Pulley 132 is also on shaft 130. This pulley receives a cross-belt from the line-shaft. Pulley 131 receives a straight belt from the line-shaft. It will therefore be seen that the counter-shaft 130 will have a movement depending upon the clutches 133 and 134, which are operated by levers 135 and 136. It will be seen that movements are imparted to the sliding frames 122 at both ends of the machine simultaneously to move the drums apart to strip the boxes and to bring them together at the beginning of each operation. In the sliding movements of the frames 122 shaft 15 remains stationary, while boxes 17 slide with the frames, boxes 16 being stationary.

135ᶜ is the main driving-pulley on line-shaft 26. The housing 23, which contains the ratchet-dog 22, incloses the sides of the ratchet-wheel 19 and is maintained in position by studs 22ª, which pass through the sides of said housing and enter annular grooves 22ᵇ on each side of said wheel. (See Fig. 13.)

136 137 are the main driving-pulleys on line-shaft 26 for the horizontal reciprocating movement of the drums.

The operation of the machine is, briefly, as follows: The veneer blank, Fig. 21, is fed into opening 6, Fig. 8, which is at the upper part of the drums 5 5, the end of the blank being projected under the lip 7, Fig. 15. The drums 5 5 are then started through ratchet 19 by throwing clutch 33 and lever 33ª. The blank follows the drums around. There are nine teeth on the ratchet 19, and a stop of the drums is made for each tooth, during which the nails and tacks are driven into the bands or hoops and the bodies of the boxes. When the eigthth tooth on wheel 19 is reached, the clutch 33 is thrown out and the other clutch 33ᶜ is thrown in by hand-lever 33ᵇ. At this time the metallic strips $h$ are nailed in position. The saws 51 52 then come into operation through lever 57ª. The stripping of the boxes from the drums takes place through operations of levers 135 136.

Having described my invention, I claim—

1. In a cylindrical-box machine, the combination of drums, means for imparting rotary movement to said drums during which the boxes are formed, mechanism for uniting the ends of the boxes and the hoops on the outer surface thereof, means for severing the cylinder from which the boxes are made, into suitable portions, and means for imparting longitudinally-reciprocating movements to said drums to strip the boxes therefrom.

2. In a cylindrical-box machine, the combination of drums, means for imparting rotary movement to said drums during which the material from which the boxes are constructed is carried around said drums, means for supporting the bottoms of the boxes in position to be received by the drums, nailing mechanism for uniting the material from which the boxes are formed, means for sawing or cutting the cylinder into suitable parts to form the boxes, and means for subsequently imparting longitudinally-reciprocating movement to the drums to strip the boxes therefrom.

3. In a cylindrical-box machine, the combination of drums, means for imparting rotary movement to said drums during which the material from which the boxes are formed is carried around said drums, nailing mechanism for uniting the material from which the boxes are formed, further mechanism for applying metallic strips to the ends of the bands or hoops of said boxes, means for cutting the cylinder from which the boxes are formed into suitable portions, and means for imparting longitudinally-reciprocating movement to said drums at the completion of the formation of the boxes and during which said boxes are stripped from the drums.

4. In a cylindrical-box machine, the combination of drums, means for imparting intermittent rotary movement to said drums, during which the material from which the boxes are formed is carried around said drums, means for nailing said material during such intermittent rotary movement, means for imparting a subsequent continuous rotary movement to said drums during which the cylinder is formed from the material, cutting mechanism adapted to cut the cylinder in suitable portions to form boxes, means for uniting the metallic strips to the ends of the bands around said cylinder, and means for imparting horizontally-reciprocating movement to said drums at the completion of the formation of the boxes during which said boxes are stripped from the drums.

5. In a cylindrical-box machine, the combination of drums, means for imparting intermittent rotary movement to said drums, during which the material from which the boxes are formed is made into a cylinder, means for uniting said cylinder, and bands thereto, means for imparting a subsequent continuous rotary movement to said drums, means for cutting the cylinder in suitable portions during the last-named movement, means for supporting the bottoms of the boxes in position to be held by the drums during the formation of the cylinder, and mechanism for imparting horizontally-reciprocating movement to said drums after the boxes have been made and during which the boxes are stripped from the drums.

6. In a cylindrical-box machine, the combination of drums, means for imparting intermittent rotary movement to said drums, during which the cylinder from which the boxes are formed is completed, mechanism for uniting said cylinder during such movement, mechanism for uniting the ends of the bands or hoops around said cylinder by means of metallic strips, means for feeding such metallic strips into proper positions to be united to said bands, and cylinder, means for cutting the cylinder into suitable portions for boxes, means for supporting the bottoms of said boxes in positions to be received by the drums at the initial operation of said drums, and means for spreading or separating said drums at the completion of the boxes whereby said boxes are removed from said drums.

7. In a cylindrical-box machine, the combination of drums, means for imparting a rotary intermittent movement to said drums and a continuous rotary movement after the completion of said intermittent movement during which movements the material from which the boxes are made is formed in cylindrical shape around said drums, nailing mechanism for uniting the material in cylindrical form during the intermittent movement of the drums, and nailing mechanism for attaching metallic strips to the adjacent ends of the hoops or bands inclosing said cylinder, means for feeding said metallic strips into proper position to be united to said hoops or bands, and means for cutting the cylinder into suitable portions for boxes.

8. In a cylindrical-box machine, the combination of drums, means for imparting a rotary intermittent movement to said drums and a continuous rotary movement after the completion of said intermittent movement during which movements the material from which the boxes are made is formed in cylindrical shape around said drums, nailing mechanism for uniting the material in cylindrical form during the intermittent movement of the drums, nailing mechanism for attaching metallic strips to the adjacent ends of the hoops or bands inclosing said cylinder, means for feeding said metallic strips into proper position to be united to said hoops or bands, means for cutting the cylinder into suitable portions for boxes, and means for holding the bottoms of the boxes in position to be clamped by the drums in their initial movement.

9. In a cylindrical-box machine, the combination of drums, means for imparting an intermittent rotary movement and a continuous rotary movement after the completion of said intermittent movement during which movements the material from which the boxes are constructed is formed into cylindrical shape, nailing mechanism mounted on opposite sides of the machine, one set of such mechanism being adapted to unite the cylinder during the intermittent rotary movement of the drums, and the other set of said nailing mechanism being adapted to unite metallic strips to the ends of the bands or hoops inclosing said cylinder at the completion of said intermittent rotary movement, means for feeding said metallic strips into proper positions to be united to the bands, and means for severing the cylinder into suitable portions for boxes.

10. In a cylindrical-box machine, the combination of drums adapted to rotary and longitudinally-reciprocating movements, the former of such movements being adapted to form the material from which the boxes are made into cylindrical shape, and the latter of such movements being adapted to strip the boxes from said drums after their completion, means for holding the bottoms of the boxes in position to be held by the drums in their rotary movement, nail-driving mechanism adapted to unite the cylinder during the rotary movement thereof with the drums, means for feeding metallic strips into proper positions to unite the ends of the bands, nail-driving mechanism adapted to unite said metallic strips as they are fed in proper positions, and means for cutting said cylinders into proper parts for boxes after the operations of uniting said cylinder and the bottoms.

In testimony whereof I affix my signature in presence of two witnesses.

WILLIAM H. STOUT.

Witnesses:
  WILLIAM A. SINCLAIR,
  JOHN H. MEYER.